United States Patent [19]

Dollé

[11] Patent Number: 4,604,771

[45] Date of Patent: Aug. 12, 1986

[54] APPARATUS FOR THE PREPARATION OF SKEWERS OF MEAT, VEGETABLES, OR THE LIKE PRODUCTS

[76] Inventor: Jacques Dollé, 1060 Avenue de la Trillade, 84003 Avignon, France

[21] Appl. No.: 437,455

[22] Filed: Oct. 28, 1982

[30] Foreign Application Priority Data

Oct. 28, 1981 [FR] France .............................. 81 20367

[51] Int. Cl.⁴ .............................................. A22C 17/02
[52] U.S. Cl. ............................................ 17/45; 17/1 S; 83/466.1; 227/139
[58] Field of Search .................... 17/1 S, 52; 83/466.1; 227/139

[56] References Cited

U.S. PATENT DOCUMENTS 2,303,566 12/1942 Majestic ....................................... 17/1
3,691,608 9/1972 Lowrance ............................. 29/211

FOREIGN PATENT DOCUMENTS 2494092 5/1982 France .
6813550 3/1970 Netherlands .

*Primary Examiner*—Willie G. Abercrombie
*Attorney, Agent, or Firm*—Sandler & Greenblum

[57] ABSTRACT

An apparatus for automatically piercing layers of meat, vegetables and other food products for purposes of manufacturing a plurality of skewers ready for cooking. The apparatus includes a carving basket capable of receiving layers of food products. A plurality of piercing tubes containing skewering spikes are vertically inserted through the carving basket. A carving apparatus is provided which slices the superimposed layers of food products in order to obtain measured pieces of food pierced on the skewering spikes.

38 Claims, 30 Drawing Figures

FIG. 14.
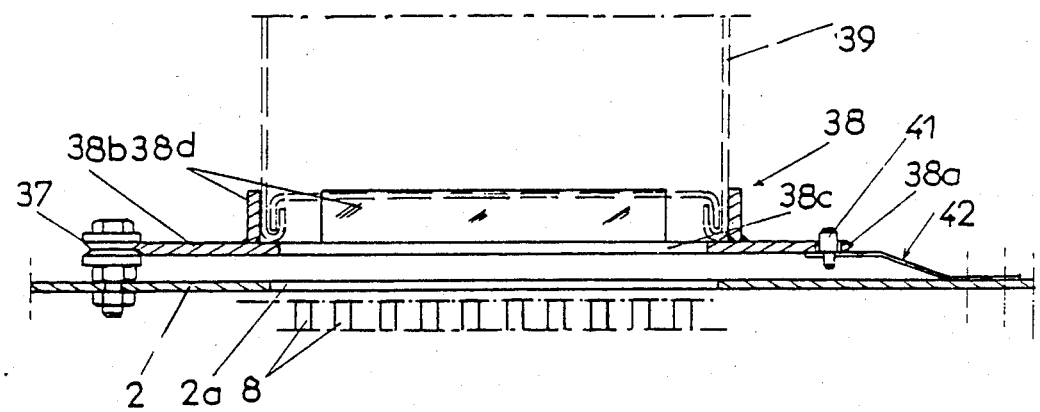
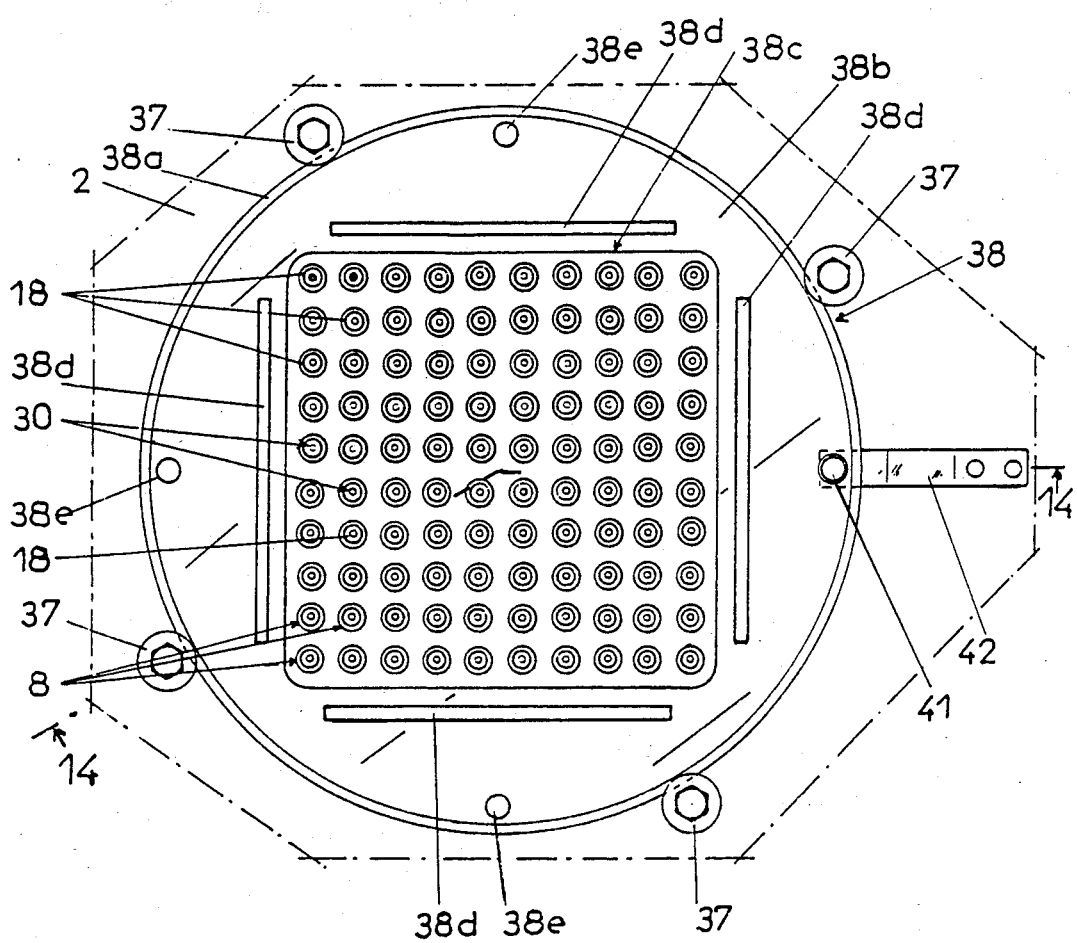
FIG. 13.

FIG. 16.
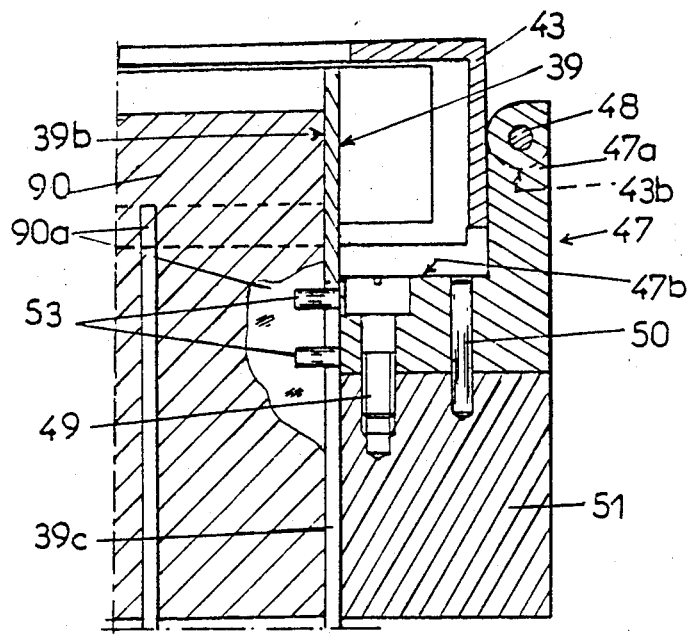
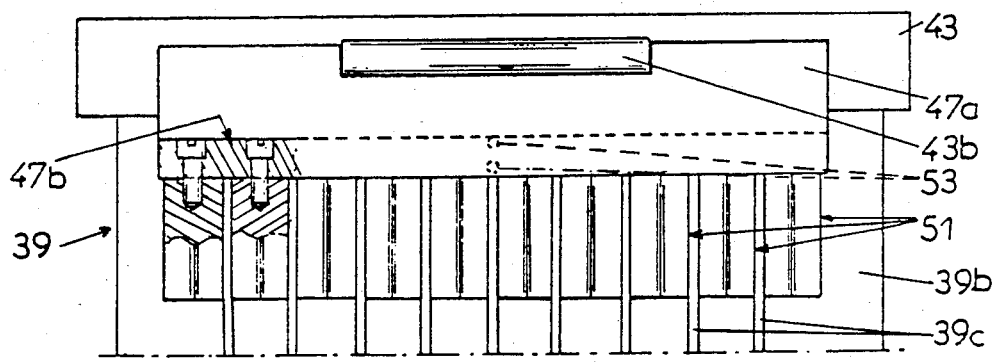
FIG. 17.
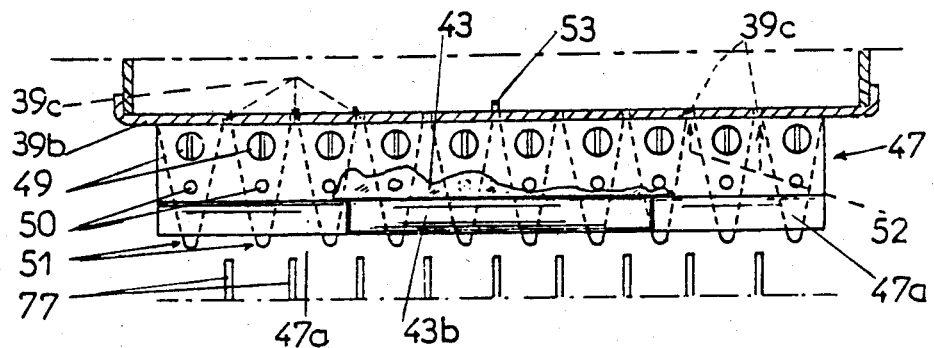
FIG. 18.

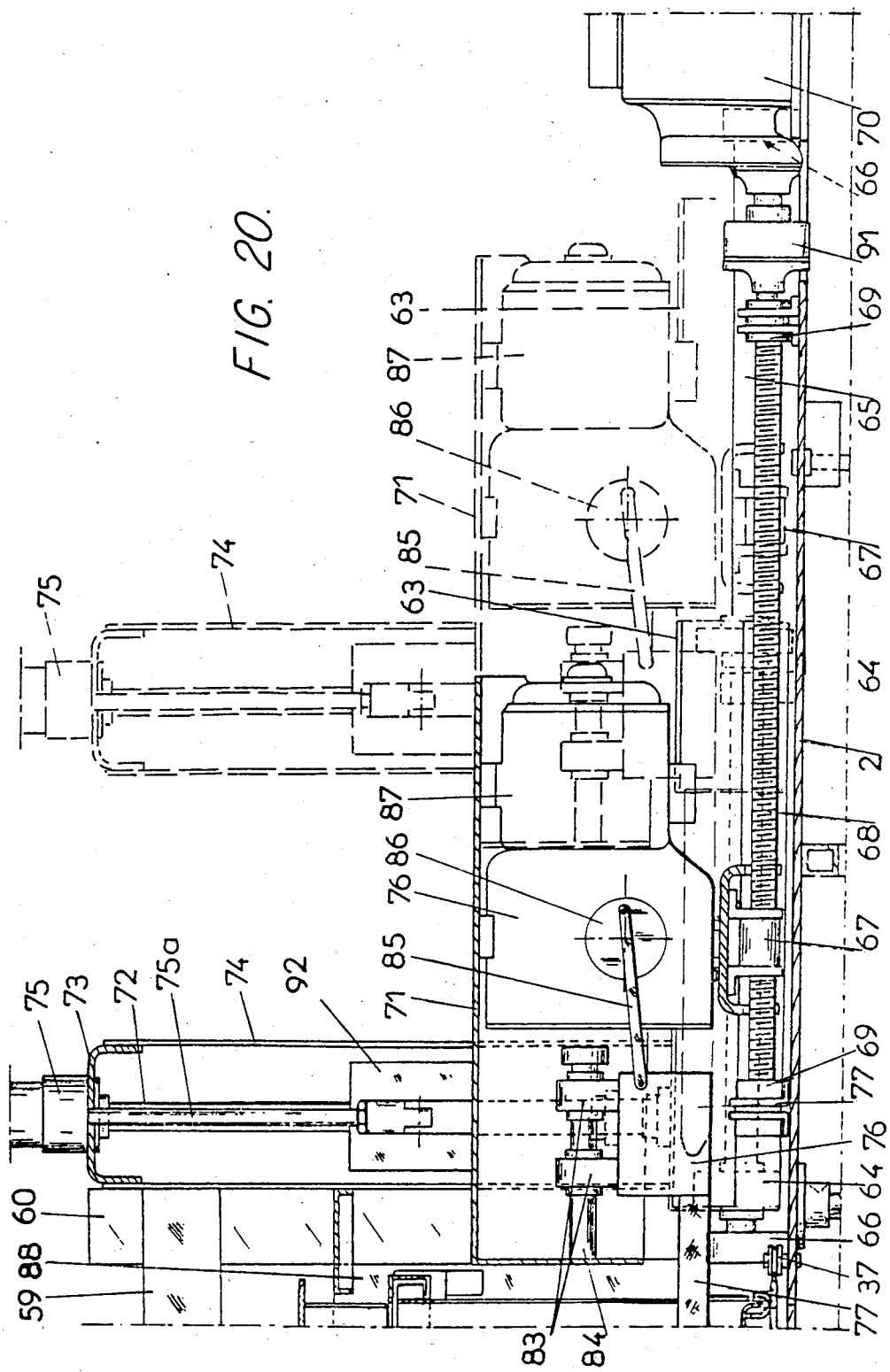

APPARATUS FOR THE PREPARATION OF SKEWERS OF MEAT, VEGETABLES, OR THE LIKE PRODUCTS

BACKGROUND OF THE INVENTION

1. Field of the Invention

The present invention relates to an apparatus for the automatic piercing of slices or layers of meat and/or other alimentary products such as fish, vegetables or various fruits, for the purpose of the manufacture of skewers ready for cooking.

More specifically, although in no way limiting, the invention relates to a piercer capable of utilizing carving and piercing baskets whose lateral walls are, in a known fashion, provided with vertical slots for the passage of one or more cutting blades. The baskets further comprise generally a base plate and a cover provided with rows of vertical holes allowing for the sliding and the guiding of "spikes" constituted by wooden rods or by metallic shafts.

2. Discussion of Prior Art

The preparation of skewers still requires a relatively long time, primarily because the problem posed by the piercing of slices of meat or other alimentary product has not been satisfactorily resolved. It has previously been known to effect a pre-perforation of the layers of piled meat with the aid of rigid and pointed solid shafts, but this requires repeated efforts which become rapidly troublesome. Additionally, manually inserted spikes do not always have a tendency to follow exactly the passage opened by the pre-perforation, which then leads to their sectioning during slicing.

In order to attempt to remedy the constraints of the manual and unitary driving in of the spikes, applicant in French Patent Application No. 80/24482 discloses an automatic apparatus comprising one or more pairs of horizontal friction rollers provided with regularly spaced annular grooves, the points of contact of the annular grooves of the pairs of rollers being disposed in alignment with the holes of the lower and upper platforms, respectively, of the carving vat. The rotational driving of the pairs of rollers allows for the insertion of the spikes utilized for the manufacture of skewers, in the direction of the carving basket. Nevertheless, such an apparatus does not give entire satisfaction, because the spikes are not always inserted in a rectilinear manner and it frequently happens that certain of them are deviated and twisted, for example, by contacting cartilagenous pieces that can be found in the slices of meat. Moreover, even with such an apparatus, it is often necessary to effect a pre-perforation of the piled slices of meat.

SUMMARY OF INVENTION

Accordingly, it is an aim of the present invention to remedy the inconveniences of the manual piercing or the procedures of substitution that were proposed up to this date.

According to the invention, this objective is obtained by means of a machine comprising of plurality of axially mobile piercing tubes whose upper portion is adapted to receive a small skewer or spike; the said piercing tubes being slidably mounted, on one hand, across a reception platform provided with holes allowing for their passage and, on the other hand, on support and ejection shafts of the spikes or skewers.

Due to this piercing machine, it is possible to pierce succesive slices of meat or other alimentary products on the piercing tubes in which are housed the spits or spikes resting on the support and ejection shafts. Then, when a sufficient thickness of superimposed layers has been pierced, the piercing tubes are retracted from the pile of meat that rests on the reception platform and remain pierced by the ejected spikes of the said piercing tubes by the action of the said support and ejection shafts that prevent them from removing themselves at the same time as the latter.

The invention thus allows for an automatic piercing which is rapid, perfect and without significant effort, of piles of slices of meat and/or vegetables, fruits or fish, intended for the manufacture of skewers, this piercing being executed in carving vats or baskets, similar to those in present use.

According to another characteristic of the invention, support and ejection shafts are assembled with a scope of axial translation, in such a way as to be able to be completely disengaged from the reception platform and from the base of the carving basket, as well as the piercing tubes and the driving barrels supporting the said reception platform. The support of the carving basket is assembled with a capability of rotation of at least 90 degrees, in order to present two vertical, perpendicular surfaces of the carving basket facing at least one carving post or one carving apparatus equipping the machine.

Due to such an arrangement, it is possible to manufacture skewers in great quantity and in an automatic fashion, with the aid of a single machine and without manipulation of the carving basket between the operations of piercing and carving.

BRIEF DESCRIPTION OF THE DRAWINGS

These and other objects, characteristics and advantages, and will become clearer from the description that follows and the attached drawings in which:

FIG. 13 is a planar view of the support of the rotating basket.

FIG. 14 is a cross-sectional view along line 14—14 of the FIG. 13.

FIG. 16 is a side view and cross-sectional of the means of guiding of the blades of the apparatus for carving.

FIG. 17 is a frontal view, on a more reduced scale of the means of guiding the blades of the apparatus for carving.

FIG. 18 is a planar view, without the upper locking frame.

FIG. 20 is an analogous view to FIG. 19, in which the carving apparatus itself is illustrated in low advance position, the tracing and interrupted dashes showing the position of recoil or of depart of the apparatus.

DETAILED DESCRIPTION OF THE INVENTION

One refers to the said drawings to describe an interesting example of execution, although in no way limitating, of the machine for the automatic manufacture of skewers according to the invention.

For purposes of the present description and in the claims, the term "skewer" designates an article obtained by the machine according to the invention and constituted by a plurality of small pieces of pierced meat and/or of vegetables fruits, fish, and the term "spike" designates the small spit or rod intended for the piercing of the said pieces.

Figure 1:
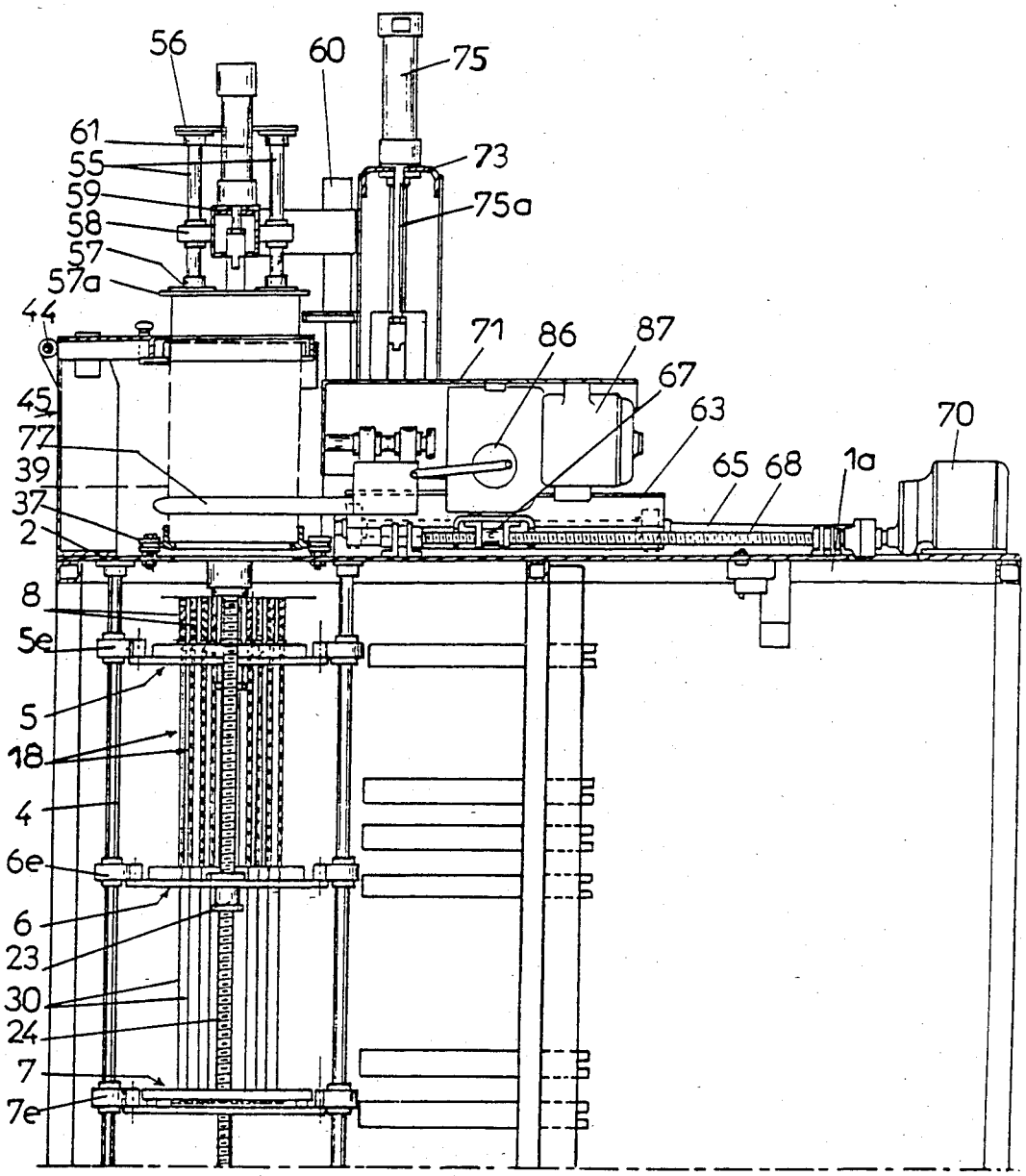
FIG. 1 is a side view of the machine for the automatic preparation of skewers, according to the invention.
Figure 2:
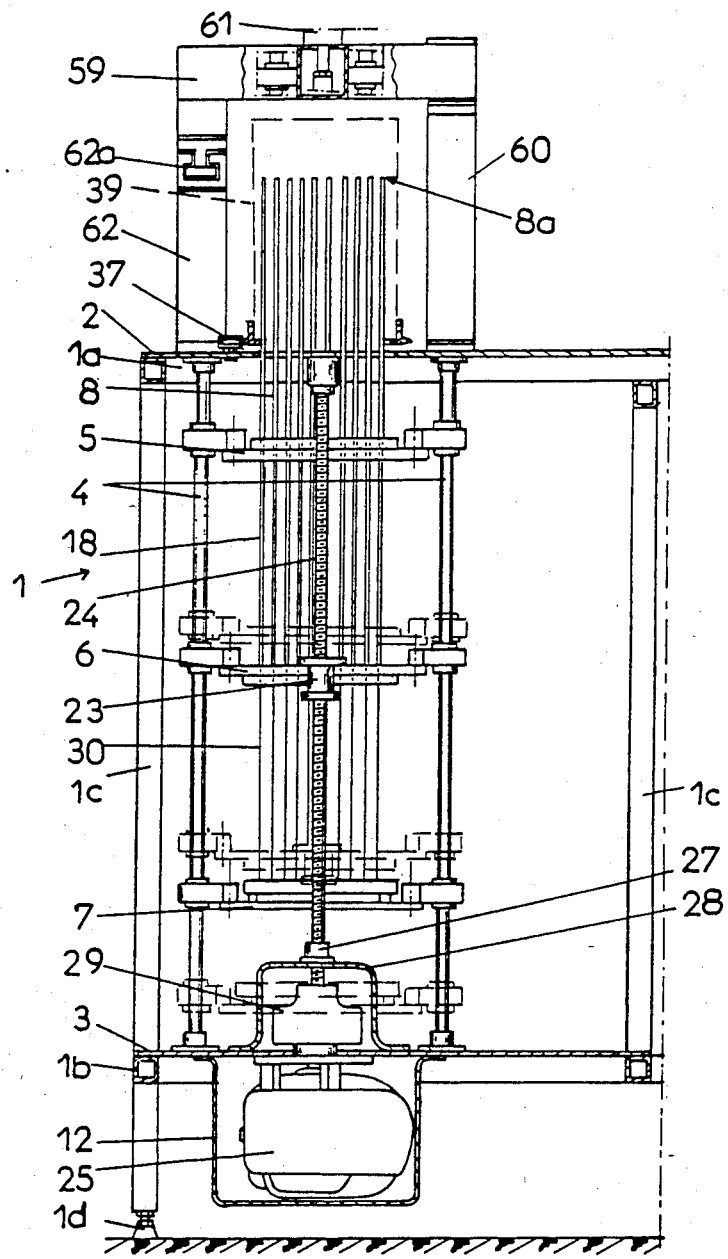
FIG. 2 is a side view of the invention showing only the piercing apparatus; the tracing in dotted lines illustrates the low position of the upper, intermediary and lower platforms.
Figure 3:
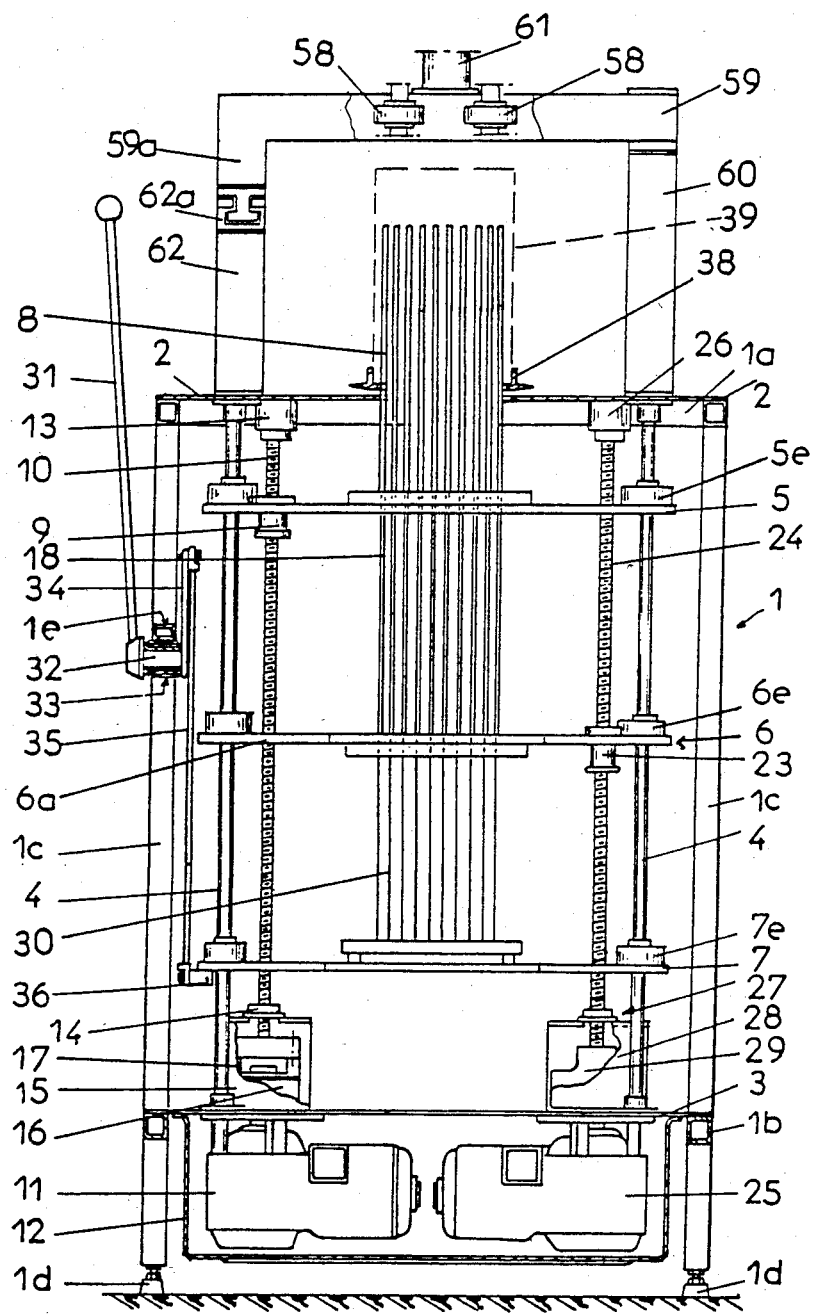
FIG. 3 is a front view of the piercing apparatus.

As illustrated best in FIGS. 1, 2 and 3, the machine according to the invention includes a framework 1, for example, made with mechanically welded tubes of square cross-sections and comprising principally an upper frame 1a and a lower frame 1b joined by the post 1c. Framework 1 rests on four feet 1d adjustable in any known manner for the leveling the frame. Positioned on upper and lower frames 1a and 1b, are fixed plates 2 and 3, respectively. These plates are rigidly joined by four guiding columns 4 whose points of attachment are placed at the angles of a quadrilateral. Between the fixed upper plate 2 and the fixed lower plate 3, are mounted, with a capability of vertical displacement, a first upper platform 5, a second intermediary platform 6, and a third lower platform 7, whose corners are equipped with ball sockets, respectively 5e, 6e, 7e, facilitating their sliding on the guiding columns 4.

Figure 4:
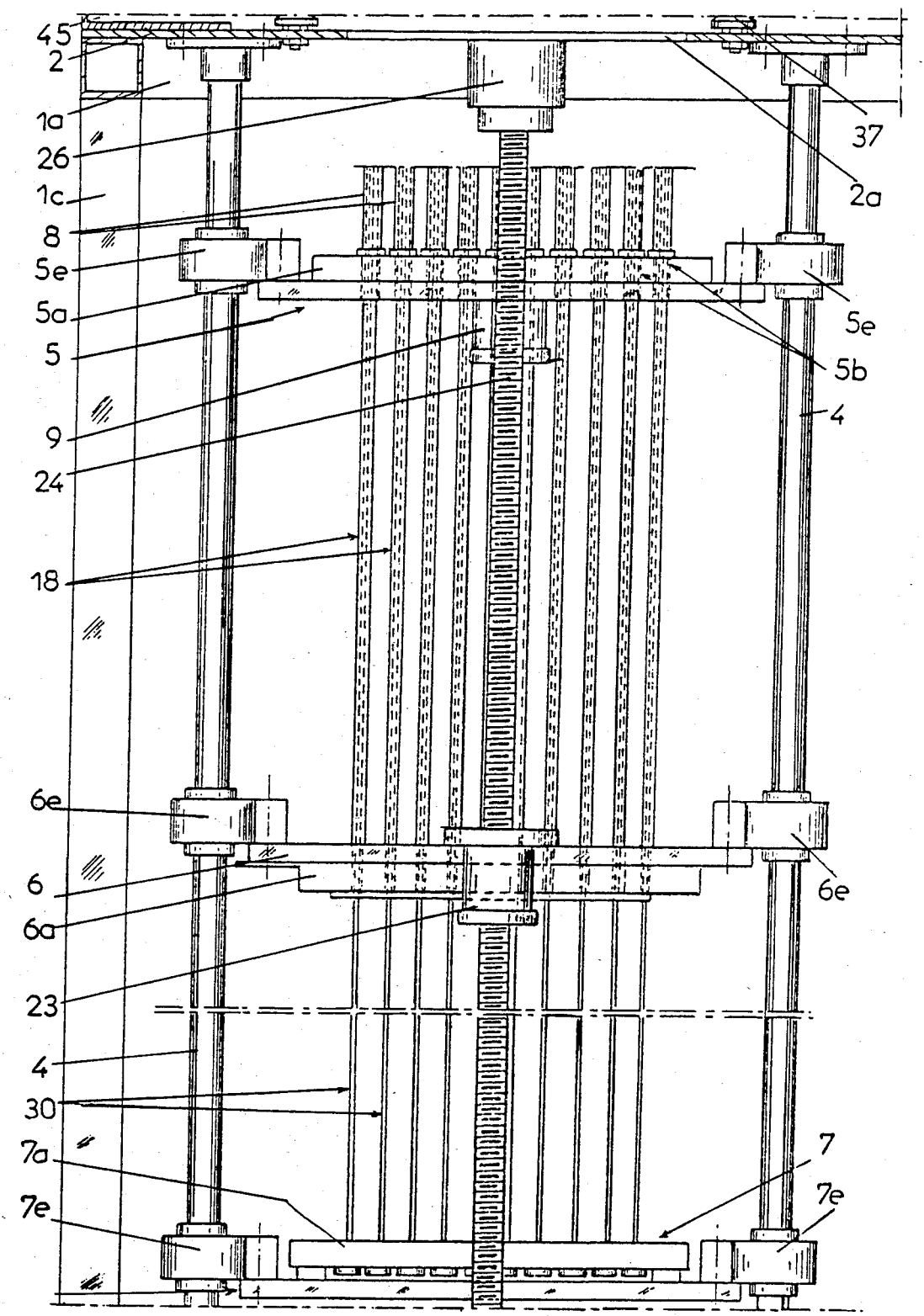
FIG. 4 is a detailed view illustrating the assembly of the mobile platform supporting the driving barrels, the piercing tubes and the support and ejection shafts.
Figure 6:
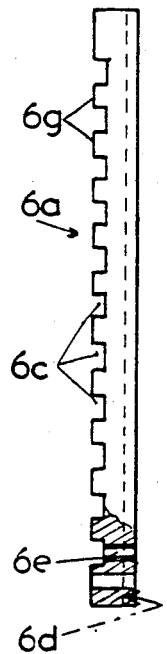
FIG. 6 is a side view with partial cut-away of the plate of FIG. 5.
Figure 5:
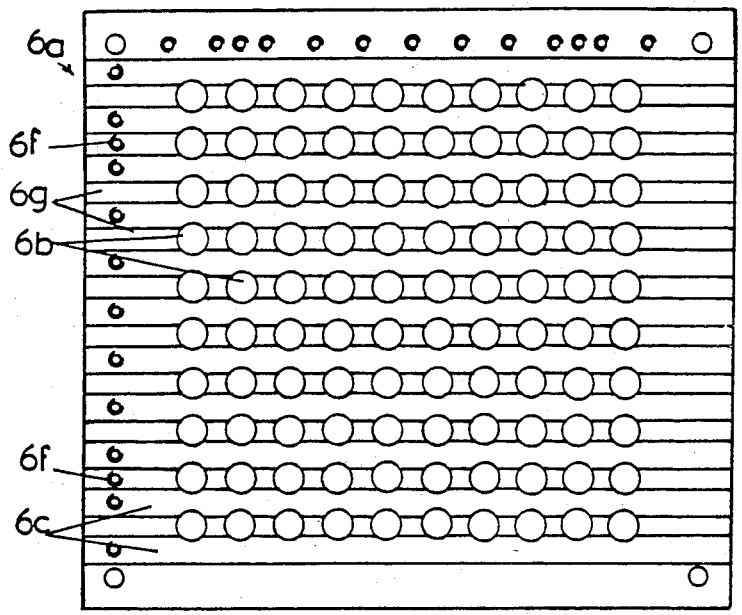
FIG. 5 is a planar view of the collapsible plate supporting the removable piercing tubes.
Figure 8:
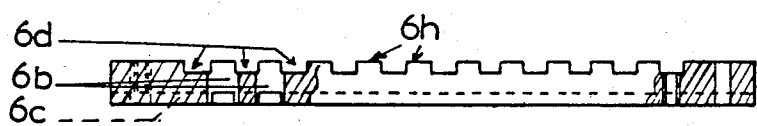
FIG. 8 is a side view, with partial cut-away, of FIG. 7.

The upper platform 5 supports a plurality of guiding and driving barrels 8 fixed vertically, by their lower end. In a preferred manner, the vertical driving barrels are supported by a fixed plate 5a, in a removable manner, on the plate 5 itself provided with a large central opening, in such a way as to allow for the convenient and rapid replacement of an interchangeable assembly comprising a certain number of driving barrels, by another assembly, including a greater or more reduced number of these latter. As illustrated in FIG. 4, the lower ends of the driving barrels are fixed in the holes 5b of plate 5a. The guiding and driving barrels are made of tubes whose upper end is provided with a circular shoulder 8a. As illustrated in FIG. 3, the upper platform 5 is equipped with a ball screw nut 9 disposed outside of the central surface of implementation of the lower end of the guiding and driving barrels and below the said platform. This ball screw nut cooperates with a vertical threaded shaft 10 driven in rotation by a motor reducer 11 housed in housing 12 fixed under the lower plate 3. The upper end of the screw-shaft 10 pivots in a bearing 13 supported under upper fixed plate 2. The lower portion of screw shaft 10 pivots in a bearing 14 carried by a housing 15 installed on the lower plate 3. A couple limitor apparatus 16 is positioned at the output of motor reducer 11, and the output shaft of couple limitor 16 is joined to the lower end of screw-shaft 10 by means of a free wheel 17 of construction known to one in this art.

The rotation of screw-shaft 10 in the proper direction drives an ascending movement of the upper platform 5, whereas the free wheel 17 allows for the descent of this latter under a force of pressure exerted from top to bottom, this pressure being in effect sufficient to provoke the rotation of the screw-shaft, due to the weak friction exerted by the ball screw nut 9.

As illustrated in FIG. 4, the intermediary platform 6 supports a plurality of piercing tubes 18, fixed vertically, by their lower end.

The vertical piercing tubes are advantageously supported by a fixed support plate 6a in a removable manner, under the platform 6 which includes a large central opening, allowing for the easy and rapid replacement of an interchangeable assembly of piercing tubes, by another assembly including a greater or more reduced number of piercing tubes. Piercing tubes 18 have an exterior diameter slightly less than the diameter of the bore of the guiding and driving barrels 8, and their length is substantially a little more than double that of the barrels 8 in which they are housed with a capability of sliding. On the other hand, the piercing tubes have an upper threaded or beveled end 18c and they slide through holes 5b provided in plate 5a; and in which are fixed or housed the lower ends of the guiding and driving barrels 8.

The intermediate or second platform 6 or, according to the preferred embodiment illustrated, the plate 6a and the piercing tubes 18 are arranged to allow for the unitary replacement of deteriorated or twisted tubes when necessary.

Figure 11:
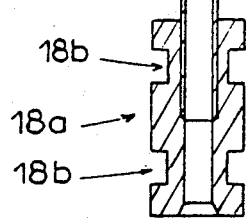
FIG. 11 is a longitudinal cross-sectional view of a piercing tube.

For that, the lower end of the piercing tubes is equipped with a mounting socket 18a including, on its periphery, two annular spaced grooves 18b as illustrated in FIG. 11.

As illustrated in FIGS. 5-8, the plate 6a comprises, in its upper and lower surfaces, parallel grooves respectively 6c and 6d of square or rectangular cross-section, the grooves provided in the upper surface being perpendicular to the grooves reserved in the lower surface. Holes 6b are provided in the thickness of the plate 6a at the vertical points of intersection of projecting bands 6g, 6h separating the grooves 6c and 6d, respectively. These holes have a diameter slightly greater than that of the sockets 18a of the piercing tubes 18, in such a way as to allow for the sliding without excessive play and the housing of these latter. On the other hand, the holes 6b and the sockets 18a have a diameter greater than the width of the projecting bands 6g, 6h, this width being equal to the diameter of the portions of the said sockets outlined by the base of the groove 18b.

Figure 9:
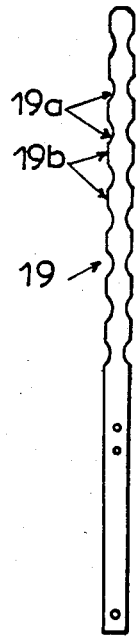
FIG. 9 is a planar view of a locking bar of the piercing tubes.
Figure 7:
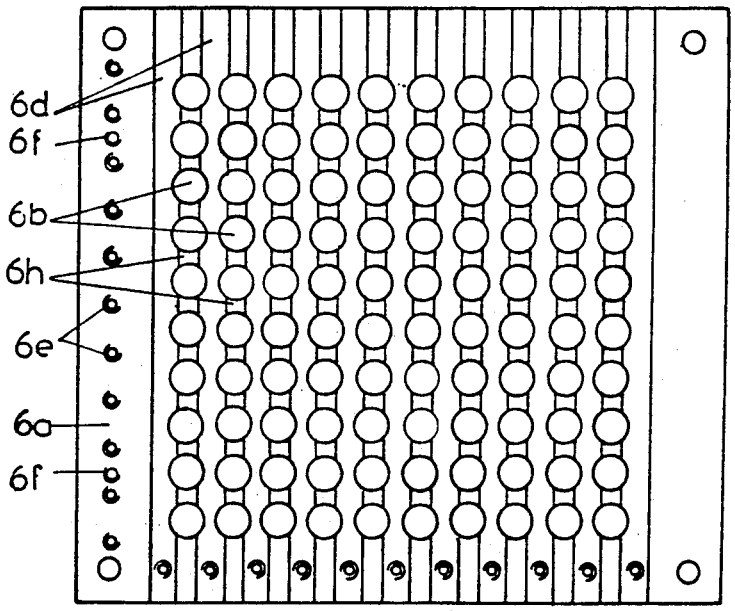
FIG. 7 is a bottom view of the plate of FIG. 5.
Figure 10:
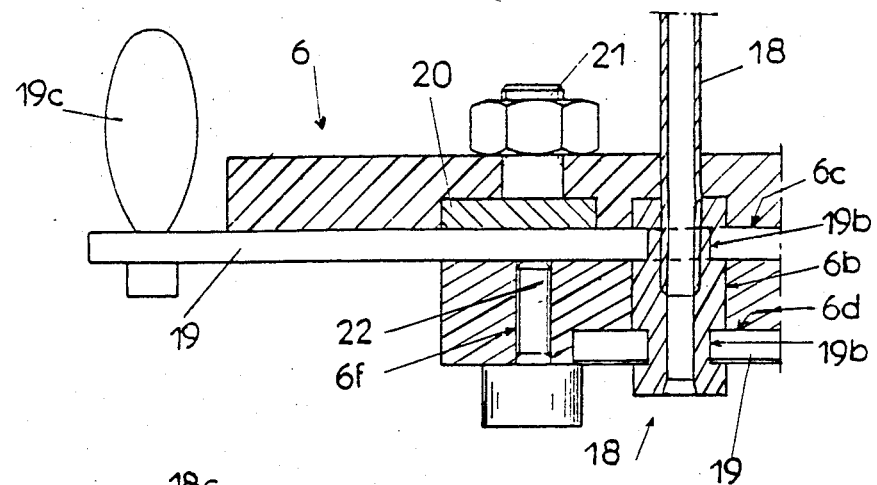
FIG. 10 is a cross-sectional view in detail illustrating the collapsible assembly of the piercing tubes on their support-plate.
Figure 12:
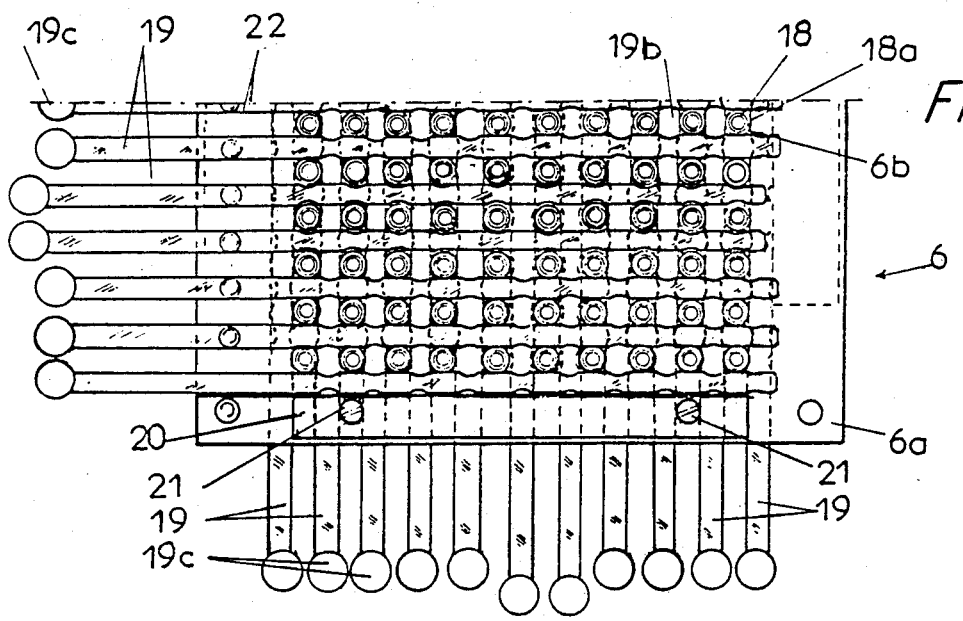
FIG. 12 is a planar view of the collapsible plate of FIG. 5 showing the liberation of the piercing tube.

A locking bar 19 is shown in FIG. 9 as being housed with a longitudinal latitude of translation, in each groove 6c or 6d. This locking bar comprises, in each of its longitudinal edges, notches 19a placed in succession and whose radius is hardly greater than the radius of the mounting socket 18a of the piercing tubes 18. These notches are spaced and separated by locking tongues 19b. In order to facilitate their sliding in the grooves 6c or 6d of the plate 6a, the locking bars 19 are provided at one of their ends, with a handling button 19c in the form of a rib as illustrated in FIGS. 10 and 12. The locking bars are maintained in groove 6c or 6d by guiding bar 20 and screw 21. The length of one of the borders of the plate 6a, perpendicularly to the said locking bars may be blocked in the locking position by means of push-screw 22 screwing in the threadings 6f provided in the plate 6a and opening into the base of the grooves 6c and 6d in proximity to one of the edges of the said plate.

The mounting socket 18a of each piercing tube 18 is positioned in a hole 6b of the plate 6a and the said socket is found blocked by the lateral tongues 19b of one pair of upper locking bars and of one pair of lower locking bars disposed perpendicularly, the said tongues being engaged in the annular grooves 18b of the socket.

To remove any piercing tube, a pair of perpendicular locking bars that surround the mounting socket of the tube may be slidably unlocked, in such a way as to place the notches 19a of the said locking bars in correspondence with the hole 6b in which is installed the said socket which can thus be removed from this latter. It is understood that in displacing two perpendicular pairs of locking bars, only the piercing tube disposed at the intersection of the said pairs will be freed, all the others remaining blocked into position on the plate 6a.

The intermediate platform 6 is equipped with a ball shaped screw-nut 23 disposed outside of the central zone occupied by the plate 6a, and below the said platform. The ball screw-nut cooperates with a vertical threaded shaft 24 driven in rotation by a motor reducer 25 which is also housed in the housing 12. The upper end of the screw shaft 24 pivots in a bearing 27 supported by a housing in the form of bridge 28 installed on the lower plate 3 and in which is housed the couple limitor 29 interposed between the output shaft of the motor reducer 25 and the lower end of the screw-shaft. Because ball screw nuts 9 and 23 do not rotate the rotation of the screw-shafts 10 and 24 causes, according to the direction of rotation of these latter, an ascending or descending movement of the upper 5 and intermediate 6 platforms, respectively. The lower platform 7 supports a plurality of support and ejection shafts 30 disposed vertically and whose diameter is less than the diameter of the bore of the piercing tubes 18. They are housed on the interior of the piercing tubes which are assembled with a capability of sliding on the said shafts. These latter are and interchangeably, by their lower end, to a fixed plate 7a, in a removable manner, on platform 7 itself.

These support and ejection shafts 30 extend through holes 6b of the intermediate platform 6-6a and the holes 5b of the upper platform 5-5a, and their upper extremity slightly go beyond the level of the upper plate 2 when the lower platforms 7-7a finds itself in high position.

The ascending and descending movements of the lower platform 7-7a are obtained by means of a manually controlled mechanical system. This system includes a handle 31 rigidly and integrally attached to one of the ends of a hub 32 mounted to turn in a bearing 33 supported by a horizontal cross-bar linking it to two posts 1c of the framework 1. On the other end of the hub is rigidly fixed by one of its ends a lever 34 whose opposite end is joined to one of the ends of a driving rod. This latter is journalled, by its opposite end, to an attachment element 36 integral with the platform 7.

An opening 2a of square shape is provided in the upper fixed plate 2, for the passage of driving barrels 8, piercing tubes 18 and the upper end of the support and ejection shafts 30.

Around this opening, or position, with a regular spacing, rollers with groove 37, for example, in the number of four spaced at 90 degrees, the said rollers being mounted for free rotation around vertical axes supported by the plate 2.

Figure 15:
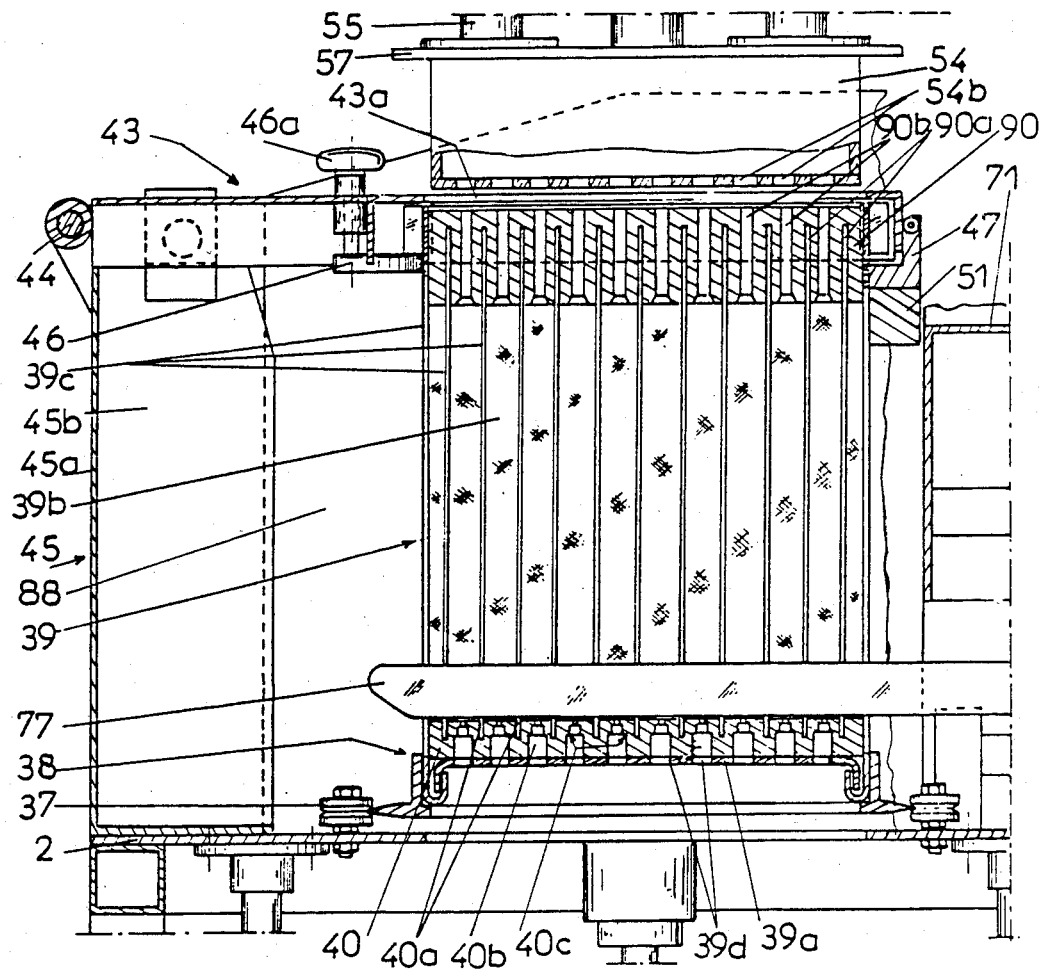
FIG. 15 is a side view and in vertical cross-section of the means of positioning and of locking of the basket.
Figure 21:
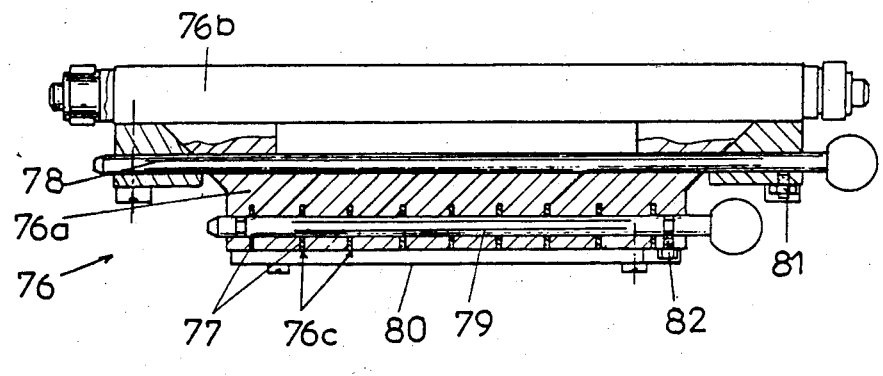
FIG. 21 is a detailed view with transverse cross-section, showing the removable assembly of the blade carrier on its block-support and the blades on the said blade carrier.

As illustrated in FIGS. 13-15, in the groove of the rollers 37 is housed the circular edge 38a of the basket support 38 which is thus separated, with a capability of rotation, by the said rollers. The basket support is constituted by a circular plate 38b which is provided with a central opening 38c of square shape and whose dimensions can be equal or slightly less than those of the opening 2a of the plate 2. Parallel to the borders of the opening 38c and at a small distance from these latter, the plate 38b supports vertical walls 38d of reduced height outlining a housing of square shape for the lower part of a vat or piercing and carving basket 39.

The carving basket which is illustrated in FIGS. 15-18 includes, in known manner, a base 39a and four lateral walls 39b assembled in collapsible manner, these latter being provided with vertical guiding slots 39c.

In the basket thus formed, is housed a lower guiding or reception platform 40 whose upper surface is provided with a plurality of perpendicular grooves 40a disposed to the right of slits 39c of the vertical walls 39b. The grooves thus form a grid outlining rows of small surfaces of support of square surfaces. According to the invention, piercing tubes 18 are assembled with a scope of sliding in a reception platform and, in a particularly advantageous manner, this reception platform is constituted by the platform 40 of the carving basket, which is assembled in a "floating" manner on the interior of the carving basket, i.e. it can be displaced in vertical translation. Platform 40 is pierced with a plurality of holes 40b disposed at the center of small square support surfaces and allowing for the passage and the sliding of the piercing tubes 18 and whose number and arrangement corresponds to the number and arrangement of the said tubes. Each hole 40b of the floating platform includes two circular superimposed notches opening onto the lower face of the said platform and intended for housing the upper end of the driving and guiding barrels 8 whose shoulder 8a urges against the circular shoulder 40c outlining the lower notch with the greatest diameter of the said hole. On the other hand, the base 39a of the carving basket is also pierced with holes 39d for the passage and the sliding of driving barrels 8.

Finally, the piercing and carving basket includes a compression cover 90 positioned in the upper part of the said basket when the basket is filled. In known fashion, this compression cover is provided with a plurality of holes 90b going through it in its thickness and its lower surface is provided with perpendicular grooves 90a, the said holes and the said groove being arranged facing holes 40b and grooves 40a, respectively with which the floating platform 40 is provided. The guiding grooves 90a have a height greater than the width of the knives of the carving apparatus described next. As illustrated in FIG. 14, the circular support base 38b of basket 38 comprises, in proximity to its periphery, four equidistant holes 38e spaced at 90 degrees. These holes are adapted to cooperate with a positioning finger 41 supported by a blade-spring 42 fixed on the upper plate 2. This finger functions to immobilize the basket support 38 in two perpendicular positions, which allows for the presentation of two perpendicular surfaces of the cutting basket 39 facing a carving post or a carving apparatus.

When the basket is installed in the carving basket support 38, its upper portion is also immobilized by a locking frame 43 journalled, by means of a horizontal axis 44, on the summit or upper edge of a protection shield 45, fixed at its base on the plate 2. As illustrated in FIG. 15, shield 45 is disposed facing the support side of the basket opposite to the side of this latter that is placed facing the carving post or carving means. It comprises a frontal wall 45a arranged facing the basket support and the carving post, and two lateral walls 45b. The pivoting locking frame 43 supports a blockage element preferably constituted by a cam 46 whose axis is integral with a handling button 46a. In the locking position, this cam comes to abut against one of the vertical surfaces of the basket. The upper locking frame 43 is provided with an opening 43a exposing the upper opening of the basket.

On the other hand, as shown in FIGS. 16-18 the side of the locking frame opposite to its articulation, supports a guide intended to center the one or more blades of the carving apparatus or tool in the upper portions of the vertical guiding slots 39c of the basket, at the time of their introduction in these latter. This guide comprises a support 47 having substantially the form of a corner iron and joined, at the summit of one of its wings, 47a, by means of an axis 40a, on a hinge 43b integral with the edge of the locking frame 43.

The lower surface of wing 47b which is perpendicular to wing 47a of the support, includes, for example, by means of screw 49 and pin 50, a plurality of guiding teeth 51 which comprise prismatic blocks having a cross-section in the shape of an isosceles triangle, whose apex is oriented in the direction of the carving post or apparatus. The ends between the teeth 52 are aligned with the vertical guiding slots 39c of the lateral wall 39b of the basket arranged facing the guiding apparatus thus embodied, and their number corresponds to that of said slots. In order to allow for a perfect centering of the ends between the teeth 52 and slots 39b, the guiding apparatus is provided with a means of positioning that includes two superimposed pins 53 supported by support surface 47 arranged facing the basket, and intended to be housed in the upper end of one of the said slots. This positioning means is preferably placed in the median part of support 47.

Figure 22:
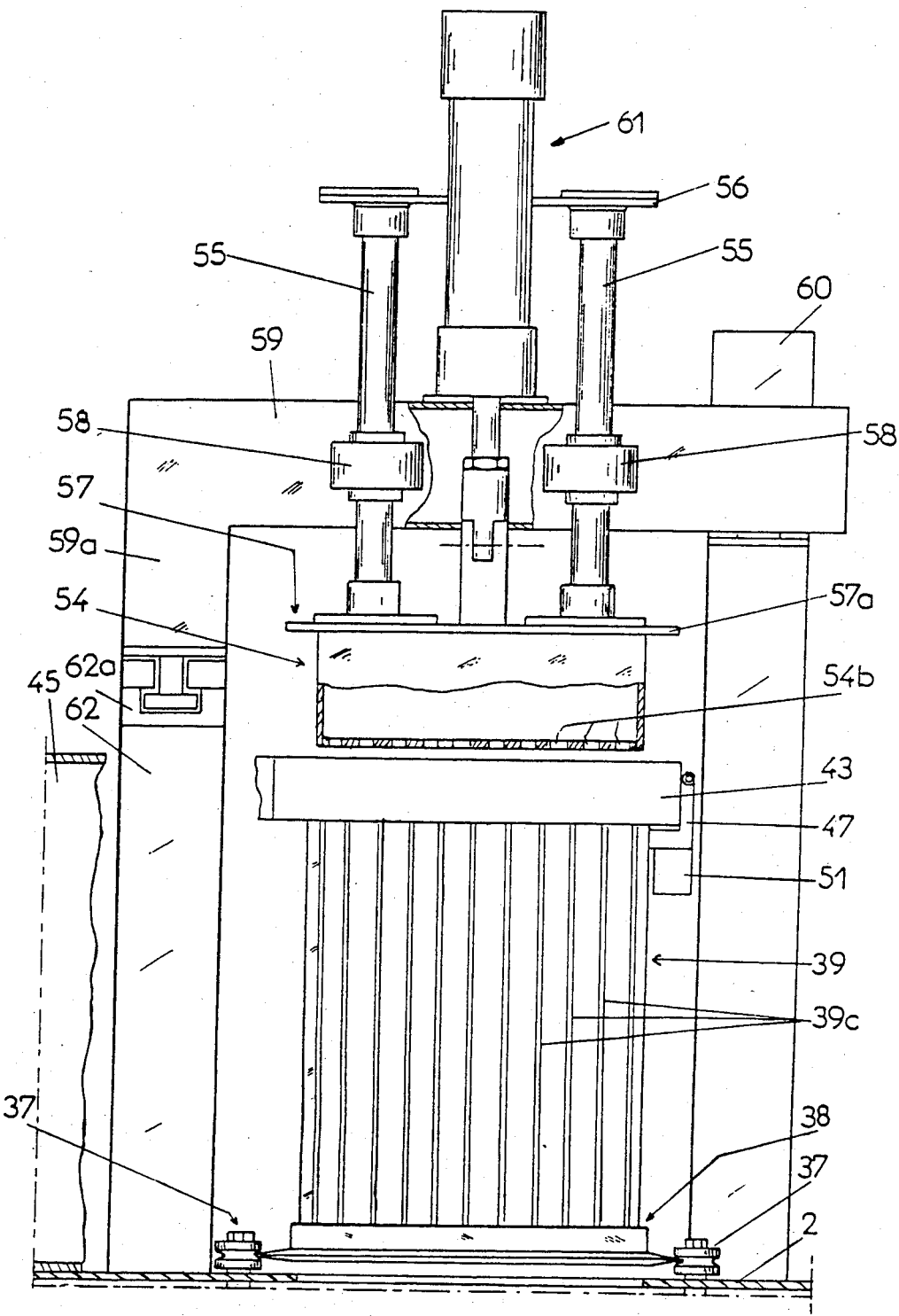
FIG. 22 is a side view, with partial cross-sections, of the presser apparatus of the piercer.

As shown best in FIGS. 15 and 22, the machine also comprises a presser apparatus adapted to ensure the piercing and the pressing of the slices of meat or other alimentary products arranged in the carving basket. This presser apparatus includes presser block 54 provided with vertically disposed openings 54b with diameter slightly greater than the exterior diameter of the piercing tubes 18 which slide in the said holes. The vertical axis of the holes 59b is aligned with the support and ejection shafts 30, the piercing tubes 18 and the guiding and driving barrels 8 which are arranged coaxially. It is clear that the number and the arrangement of the holes 54b, shafts 30, tubes 18 and barrels 8 are identical.

The aligned holes 54b, 90b, 40b, 39d, 5b, 6d, the driving barrels 8, the piercing tubes 18 and the support and ejection shafts 30 are arranged in parallel rows and their number determines the piercing capacity of the machine, which corresponds to the capacity of the carving vats. Thus, for the attainment of 100 skewers of meat, of fish and/or other alimentary products, this number will be 100 divided in 10 rows of 10.

The presser block 54 can be embodied in an identical manner by the compression cover 90 and comprises, consequently, in this case, a plurality of regularly spaced perpendicular grooves opening into its lower surface, the grooves being arranged facing the grooves 40a which are provided the upper surface of the floating reception platform 40.

As illustrated in FIG. 22, presser block 54 is fixed to the lower part of the pressure apparatus and is movable in vertical translation. This mobile assembly comprises four vertical guiding shafts 55, fixed at their opposite ends, on one hand, to a plate-cross bar 56 and, on the other hand, to a lower platform 57 itself fixed to the upper face of the block-presser. This platform 57 protrudes along its periphery beyond the block-presser 54 and its extended peripheral lip 57a arranged above and at a distance from the pressure surface of the said block-presser, constituting a peripheral stop limiting the sinking of this latter in the interior of the carving basket. The guiding shafts 55 are assembled with a capability of sliding in the sockets with vertical axes and, preferably, in the ball sockets 58 supported by a horizontal bracket 59, journalled at one of its ends; at the summit or upper edge of column 60, by its base, on the plate 2. This bracket also supports, in its median part, a pneumatic jack 61 arranged vertically and whose shaft 61a is fastened to the lower platform 57 supporting the presser-block 54.

It is understood that the extension of jack 61 leads to a translation towards the base of a block-pressure 54, whereas the retraction of the said shaft provokes the ascension of the said block-presser. The bracket 59 is capable of pivoting horizontally. Its free end 59a is arranged in order to be able to lock at 62a on to a second column 62 supported by the plate 2, in such a way as to prevent the flexion of the journal and the bracket, notably at the time of pressing operations. Columns 60 and 62 are arranged on both sides of the basket support 38 and placed on a diagonal line with respect to the quadrilateral constituted by the front portion of the upper plate 2.

Figure 19:
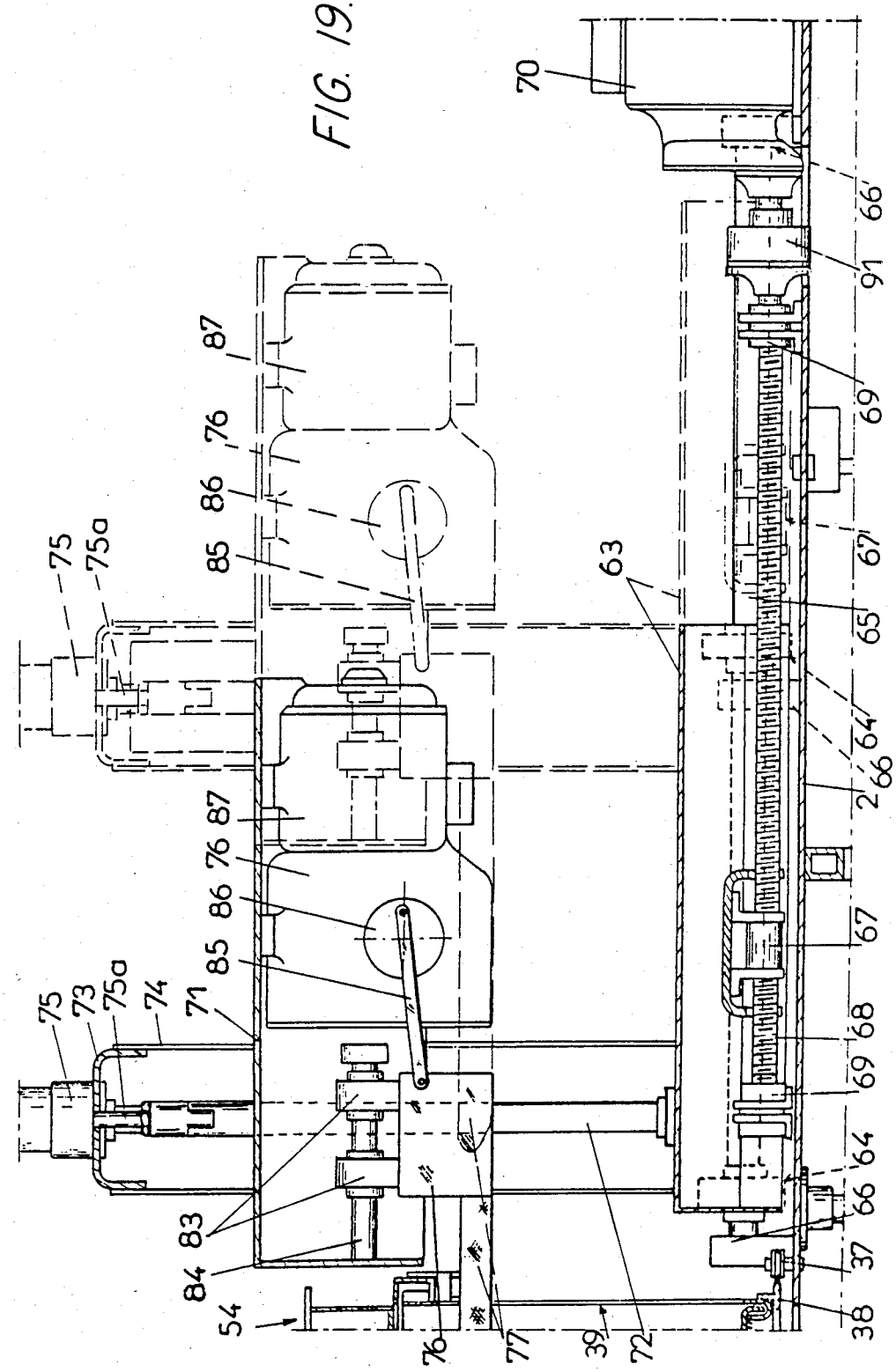
FIG. 19 is a side view, with partial cross-section, of the carving post of the machine. The carving apparatus itself being represented in high advanced position, the tracing and interrupted dashes illustrating the position of the said apparatus before its displacement in the direction of the carving basket.

The pivoting assembly of the bracket 59 around a vertical axis enables the presser apparatus to retract by lateral turning. The ends which connect the bracket to the equilibrating column 62 come into contact when the block-presser 54 is vertical to the carving basket. The bracket 59 is equipped with a handle (not represented). As illustrated in FIGS. 19 and 20, the machine according to the present invention further comprises a carving or automatic slicing post for super-imposed layers of meat and/or other alimentary products, pierced, or not, housed on the interior of the carving vat.

The carving apparatus itself is supported by a cart 63 equipped laterally with ball sockets 64 allowing for its displacement on a horizontal guiding path constituted by two parallel smooth shafts 65 supported by supports 66 fixed on the upper plate 2, ball sockets 64 are capable of sliding on the said horizontal shafts. Cart 63 is rigidly integral with a ball shaped screw-nut 67 immobilized in rotation. This screw-nut cooperates with a threaded horizontal shaft 68 supported by bearings 69 also fixed to the plate 2. The screw shaft 68 is driven in rotation by means of a motor reducer 70 to the rear-end of said plate and coupled to one of the ends of the said screw-shaft, by means of a couple limitor 91.

It is understood that the rotation of the screw-shaft 68 initiates the advance or the retreat of cart 63, and thus the carving assembly along the direction of rotation. Furthermore, the carving apparatus itself is housed in a housing 71 laterally equipped, with ball sockets (not represented) with vertical axes supported by the supports 92 rigidly integral with the said housing and assembled with the capability of sliding on the smooth vertical shafts 72 rigidly fixed, on one hand, at their lower end, on the mobile cart 63 and, on the other hand, at their upper end, to a horizontal bracket or cross-bar 73 sustained by the posts 74 themselves fixed, at their base, to the said cart.

The bracket 73 holds, in its median part, a simple effective pneumatic jack 75 vertically disposed. Shaft 75a of jack 75 is fixed on the upper part of the housing 71 holding the carving apparatus.

When the jack is in position of extension, the carving apparatus is in low position, the return of the shaft of the said jack ensuring the elevation of the said carving apparatus which, in the course of work, redescends under the effect of gravity. The carving apparatus comprises cutting blades support 76 arranged to receive a plurality cutting blades or 77 whose number corresponds to that of the vertical slots 39c with which are provided the lateral walls 39b of the basket 39.

As illustrated in FIG. 1, cutting blades 77 are fixed horizontally and symmetrically, by means of their posterior part, in the knives support 76. In a preferred manner, this latter is embodied by two separable elements, a removable blade holder 76a having a profile in rounded tail and engaging, by sliding, in a block-support 76b forming a slide bar. A spit 78 crossing transverse bores provided in the said blade-holdes and block-support, holds blade holder 76a and block support 76b in assembly position.

The above-described embodiment of the knives support allows for a rapid changing of the assembly of cutting blades in order to replace them by an assembly of better sharpened blades or by an assembly comprising a greater or lesser number of blades, without stopping the machine for a prolonged time.

The blade-holder 76a comprises vertical slots 76c for housing the rear portion of the blades 77 which are removably fastened to the blade-holder, by means of a spit 79 crossing a transversal bore provided in this latter, to the right of said slots, and a hole which has the said rear portion of each cutting blade. On the other hand, the cutting blades are immobilized in horizontal position by a maintaining plate 80 fixed, with the aid of a screw, on the lower surface of the blade-holder 76a. Screws 81 and 82 screw in the threadings comprised by the block-support 76b. Blade-holder 76a can be placed in abuttment against the spits 78 and 79 respectively in order to immobilize these latter in locking position.

The support of knives 76 is integral with ball sockets 83 assembled with the capability of sliding on smooth horizontal shafts 84 supported by elements rigidly integral with the housing 71, and housed on the interior of this latter.

On the knife support 76 is journalled, at one of its ends, a jointed bearing 85, by its opposite end on a crank platform 86 driven in rotation by a motor reducer 87 housed in the housing 71.

It is understood that the rotation of the crank platform 86 causes an alternative horizontal movement of the knives support 76 and, consequently, of the cutting blades 77, this movement of back-and-forth insuring the carving action. The cart 63 is integral, laterally, with the protection side plates 88 which, when the said cart advances in direction of the piercing and carving basket, come to place themselves on each side of this latter.

In operation, the piercing and carving basket 39 is placed on the upper work plane and positioned in basket support 38. Locking frame 43 is folded down around the upper part of the basket which is immobilized by means of the blockage cam 46 supported by the said frame.

Figure 23:
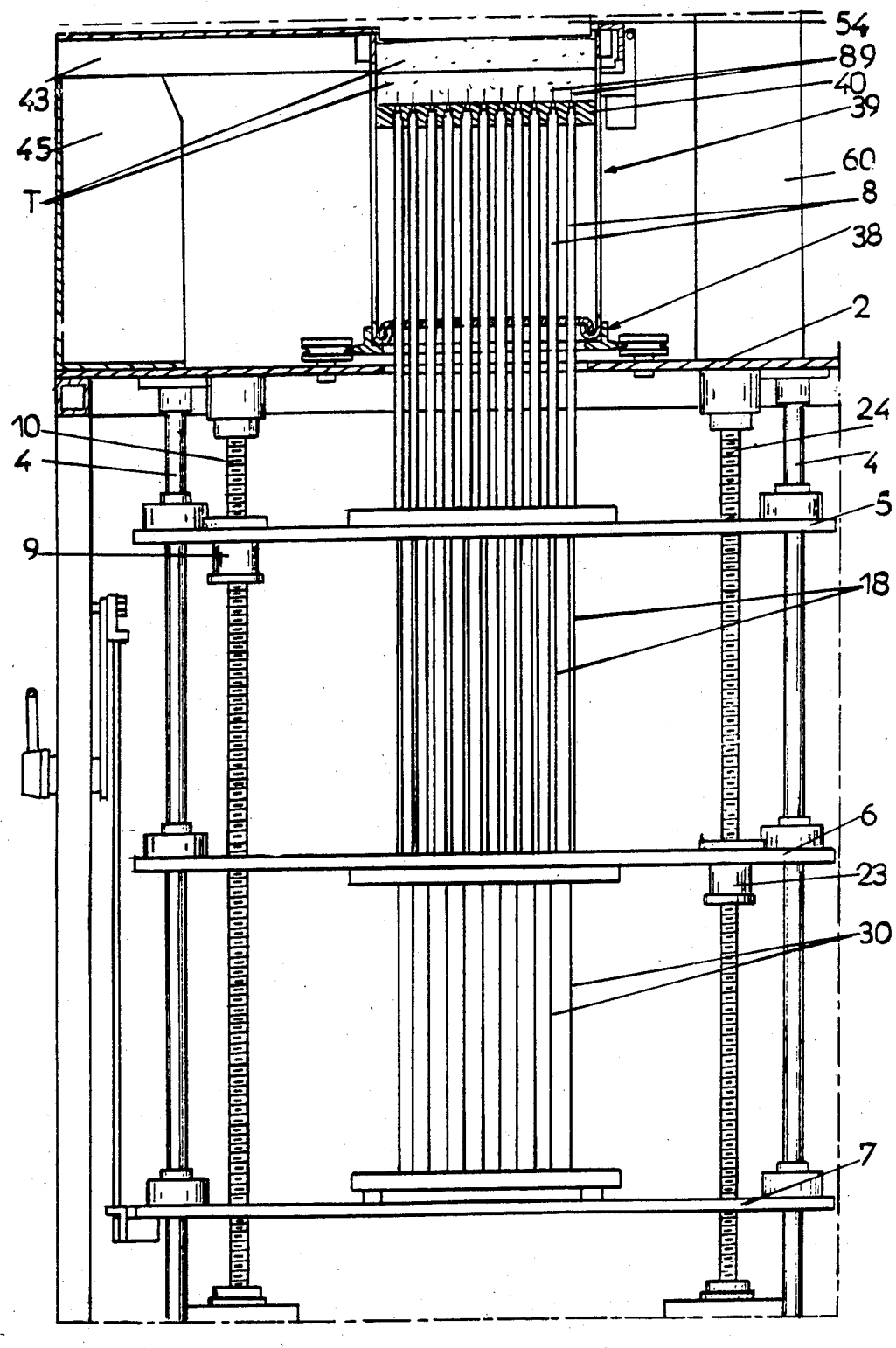
FIGS. 23-26 are frontal views illustrating the functioning of the piercing apparatus.
Figure 27:
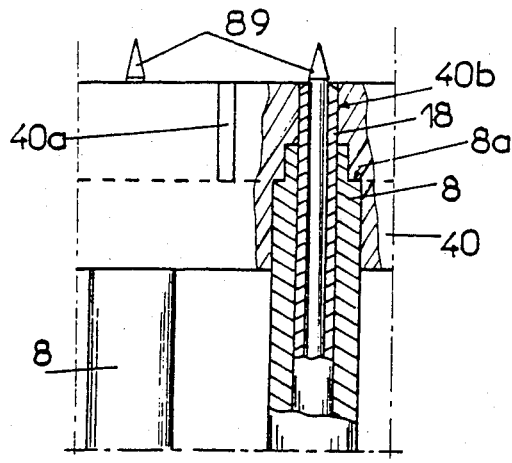
FIGS. 27-30 are detailed views corresponding, respectively, to FIGS. 23-26 and showing the positioning of the driving barrels, of the piercing tubes, of the support and ejection shafts and the spikes at the time of different phases of the piercing.

The mobile platforms 5, 6 and 7 are placed in upper position as illustrated in FIG. 23. The driving and guiding barrels 8 which are integral with the upper platform 5 cross base 39a of basket 39 and support the floating platform 40 maintained in the upper part of the basket. The spikes 89 are introduced into the upper portion of the piercing tubes 18 and rest, at their lower end, on the upper end of the support and ejection shafts 30. The upper pointed end of spikes 89 protrudes slightly beyond the upper surface of the floating platform 40 and, also beyond the upper threaded or beveled end of the piercing tubes 18 as illustrated in FIG. 27.

Figure 24:
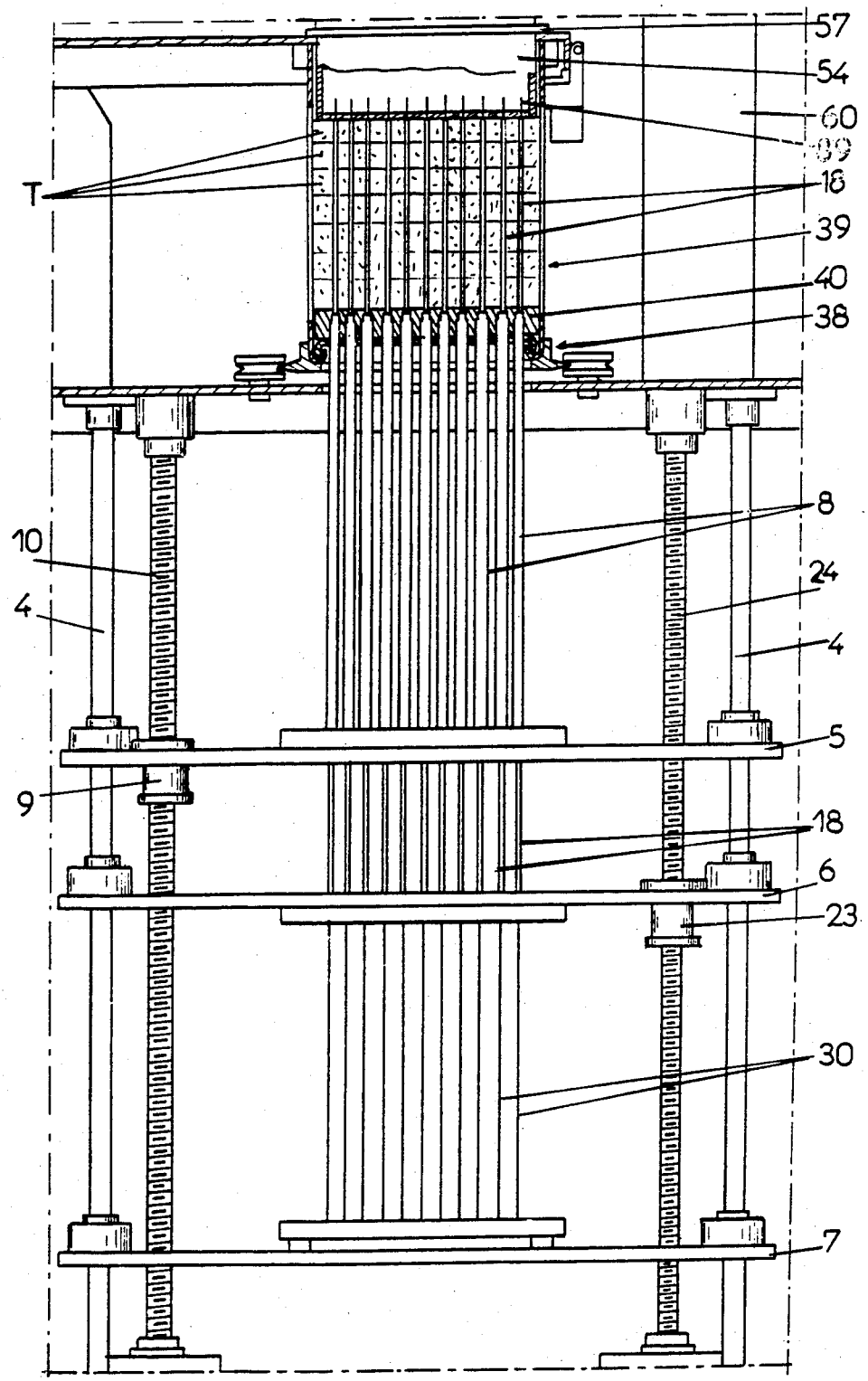
Figure 28:
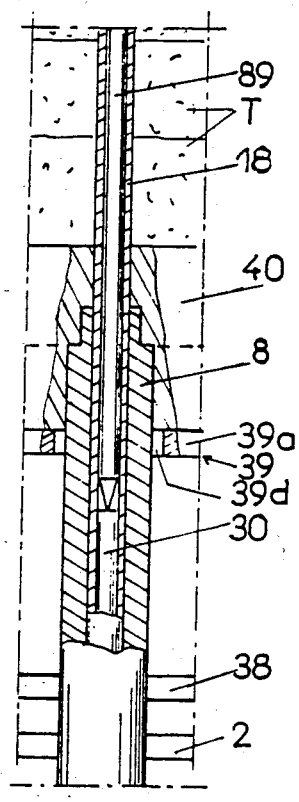

An operator positions a first "bed" formed of one or more slices T of meat or fish and/or of vegetables or other alimentary products, in the upper part of the basket, and next activates the presser apparatus with the aid of the handle equipping the bracket 59. Presser block 54 is brought above the basket and lowered by controlling the extension of the jack 61. In this way, the two hands of the operator are found occupied for reasons of security during the functioning of the presser apparatus. Under the pressure exerted by the block-presser 54, the layer of meat or other alimentary product is pushed toward the base and pierced, at the time of its descent, on the piercing tubes 18 that remain fixed. The spikes 89 and the support and ejection shafts 30, as well as the intermediary 6 and lower 7 plates remain, in effect, immobile. Simultaneously, the pushing of the presser platform causes the descent of the floating platform 40, the driving barrels 8 which slide on the piercing tubes 18, and of the upper platform 5, due to the free wheel 17. The presser apparatus is next raised and retracted laterally, and a new "bed" of meat is placed in the upper part of the carving basket and pierced with the aid of the said presser apparatus, in the manner previously indicated. The operation continues; platform 40 reaches the base of the basket that is then found totally filled as illustrated in FIGS. 24 and 28. At this moment, the upper platform 5 is in a low position, whereas the intermediary 6 and lower 7 platforms are still at high position.

Figure 25:
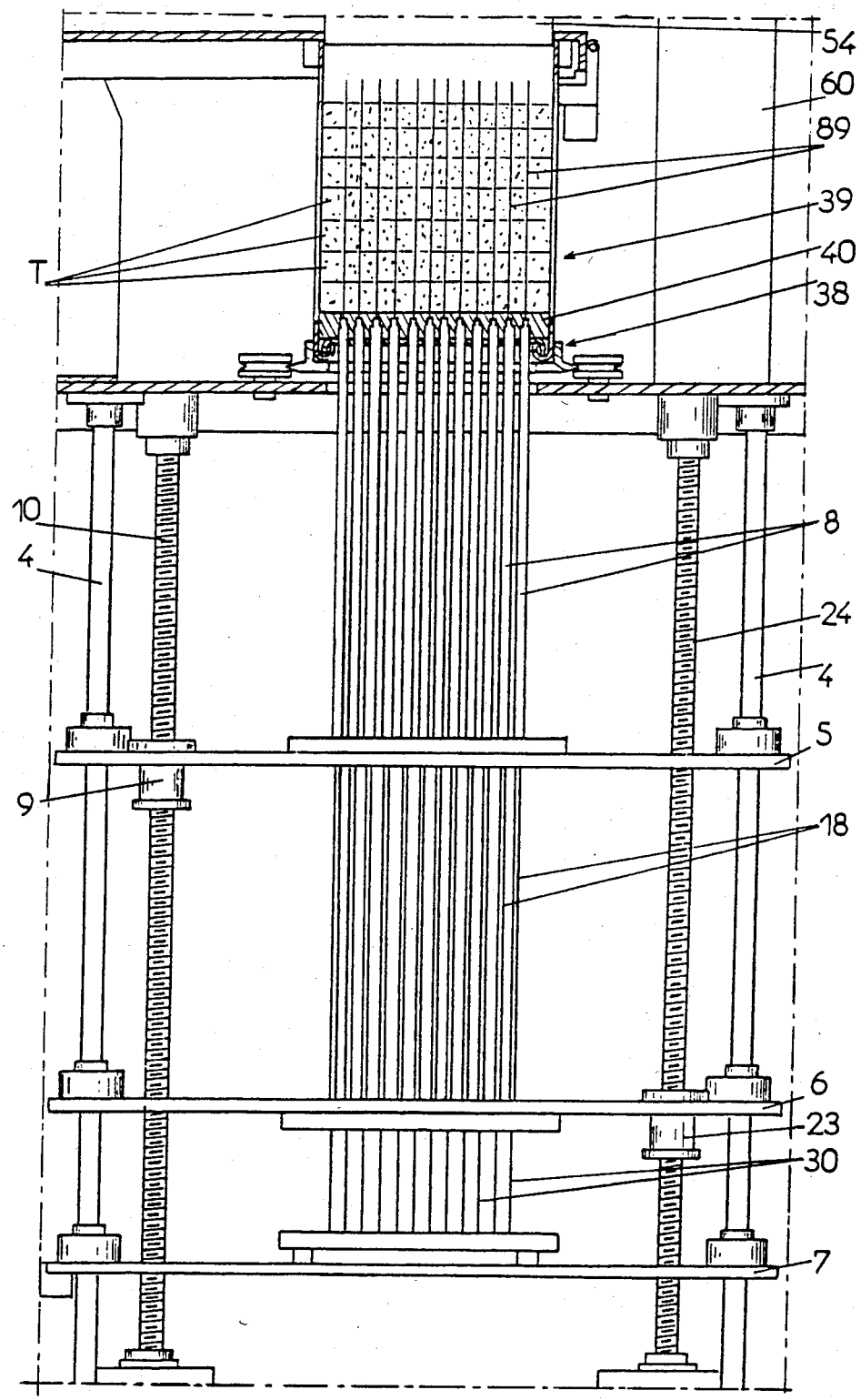
Figure 29:
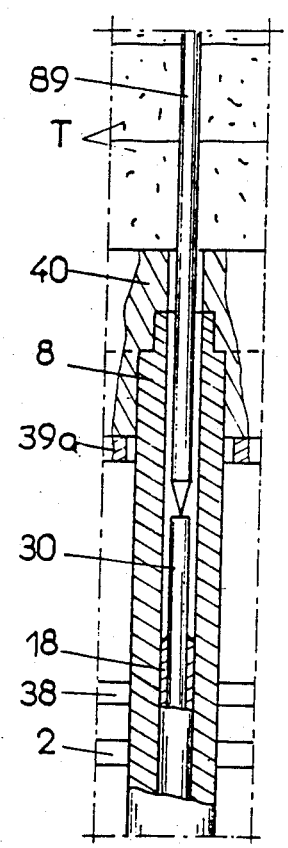

The compression cover 90 is then put in place in the upper part of the basket. Next, the intermediary platform 6 descends to a low position under the action of the motor reducer 25 and of the screw-nut system 24–23 as illustrated in FIG. 25. During this movement, the piercing tubes 18 on which is pierced the pile of meat, descend and, by sliding on the immobilized support and ejection shaft 30, are removed from this pile that is found retained by and on the platform 40. This is illustrated on FIG. 29. Spikes 89 which are housed in the upper portion of the piercing tubes, do not, however, accompany these latter in their descending translation. In effect, the spikes are ejected from the piercing tubes by the presence of the immobilized shafts 30, on the upper end of which they rest and, due to this fact, only they remain in the pile of meat resting on the platform 40. The super-imposed slices of meat and flesh or other alimentary product are pierced, therefore, only by the spikes 89, after the retraction of the piercing tubes. Once these latter are removed, the pressure of the compression cover 90, compresses the pile of meat around the spikes.

Figure 26:
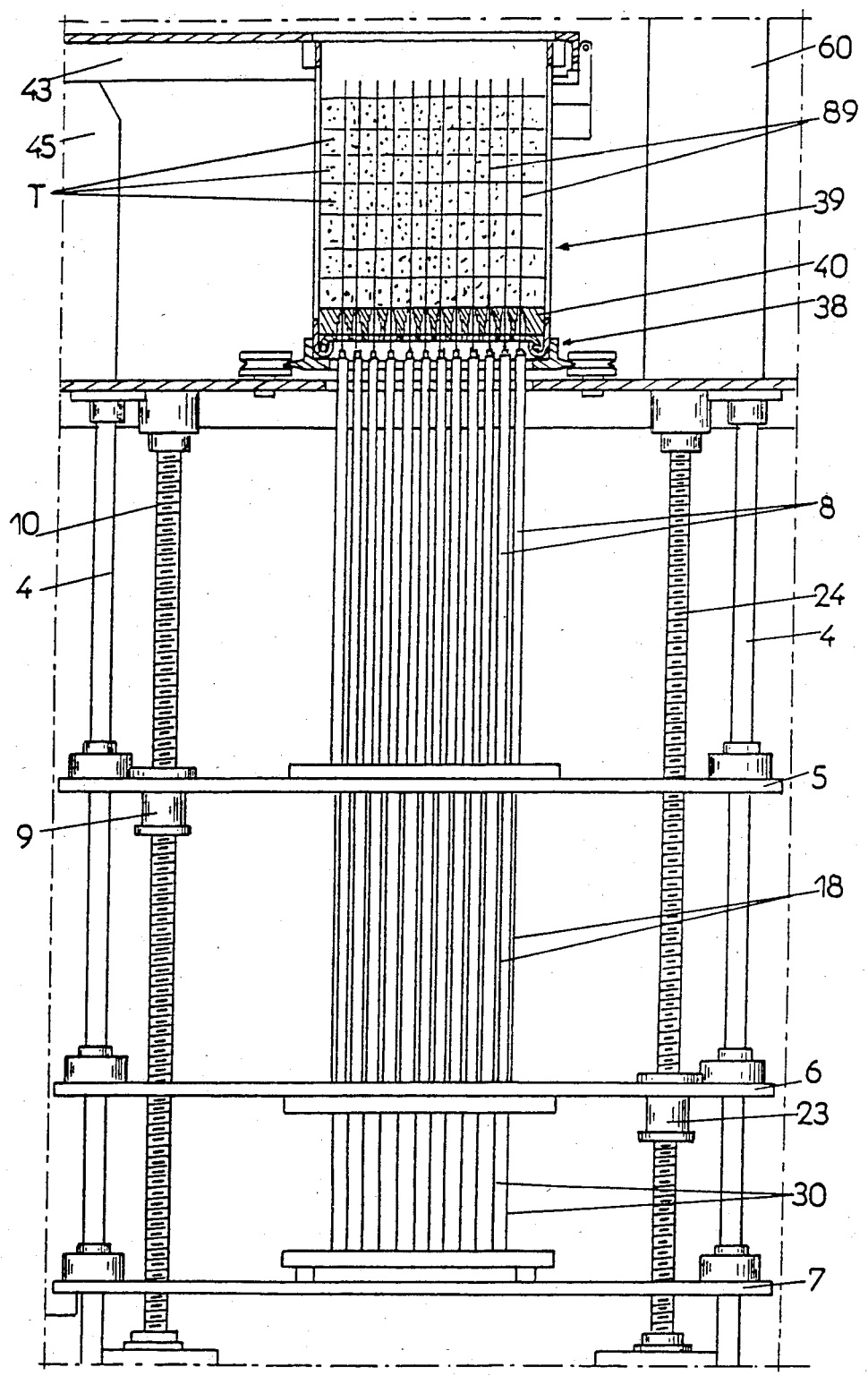
Figure 30:
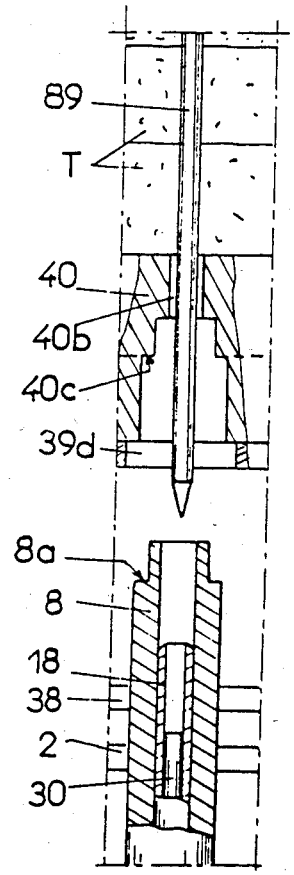

As shown in FIGS. 26 and 30, the upper platform 5 is now descended in its lowest position by means of motor 11, whereas the lower platform 7 is lowered with the aid of the handling shaft 31, which has the effect of disengaging the summit of the driving barrels 8 and the shafts 30 of the lower part of the basket.

The carving apparatus is placed the position under the action of the jack 75 and the carving assembly moves in direction of the basket due to the screw-nut system 67-68 activated by the motor reducer 70. The introduction of the cutting blades 77 in the slots 39c of the basket and in the grooves 90a of the compression cover 90 is facilitated by the guiding teeth 51.

During the advance of the carving assembly, the lateral protection flanges 88 encircle the basket and thus form with shield 45 and upper frame 43 a protection cover insuring the security as soon as the blades are in service.

When the carving assembly is in place, the motor reducer 87 is activated and drives the cutting blades of the carving apparatus along a back-and-forth movement insuring a first carving of the pierced super-imposed layers of meat and flesh and/or other alimentary products housed in the basket, along parallel lines. The carving apparatus descends freely under the effect of its own weight, as carving action proceeds, until said blades penetrate in the grooves 40a of the platform 40. When the bottom position is attained, the motor stops and the carving assembly retreats to disengage the blades of the basket.

The upper locking frame 43 is unlocked and rocked to free the upper part of the basket which next pivoted 90 degrees in such a way as to present one of its perpendicular walls facing the carving apparatus. The upper frame 43 is again folded down and locked on the upper part of the basket. The cutting apparatus is replaced in upper position, the carving assembly again advances in the direction of the basket and the said apparatus effects a second carving in a direction perpendicular to that of the first, after which the said assembly retreats to disengage the blades of the basket. This latter is then withdrawn to evacuate the manufactured skewers. A new empty basket is then installed in the upper 5, intermediary 6 and lower 7 platforms are replaced in upper initial position, and new spikes 89 are placed in the upper part of the piercing tubes 18. The machine is thus ready for a new cycle of piercing and carving.

The functioning of different posts of the machine is advantageously automated by means of an electronic and electro-mechanical apparatus known to itself. In order not to uselessly complicate the description and the drawings, this equipment will not be described which comprises notably a plurality of detectors controlling the starting and the stopping of motor reducers or the functioning of the jacks when certain of the elements of the different posts of the machine occupy determined positions.

I claim:

1. An apparatus for automatically preparing skewers of meats, vegetables, and other foods, said apparatus comprising a plurality of axially moveable skewering tubes, each of said skewering tubes having an upper end and a lower end, the upper end of each of said skewering tubes comprising means for receiving a spike adapted to be inserted along the longitudinal axis of each said skewering tube, said skewering tubes being slideably mounted within a reception platform having a plurality of holes permitting passage of said tubes, said apparatus further comprising a pressing element comprising means for pressing at least one layer of food positioned on said reception platform.

2. Apparatus in accordance with claim 1, further comprising means for retaining said spikes within said at least one layer of food when said skewering tubes are removed from said at least on food layer.

3. Apparatus in accordance with claim 2, wherein said means for retaining said spikes within said one layer of food comprise a plurality of support and ejection rods on which said skewering tubes are longitudinally and slideably mounted.

4. Apparatus in accordance with claim 1, wherein each of said skewering tubes has a longitudinal axis and wherein said reception platform is moveably mounted along said longitudinal axis of said skewering tubes.

5. Apparatus in accordance with either of claims 1 or 4 wherein said apparatus further comprises a skewering and carving basket and wherein said reception platform comprises a lower guiding plate for said basket.

6. Apparatus in accordance with claim 5 wherein said skewering and carving basket includes a stationary bottom having an aperture therein.

7. Apparatus in accordance with claim 5 wherein said pressure element comprises a compression cover for said skewering and carving basket.

8. Apparatus in accordance with claim 5 wherein said pressure element comprises a compression cover positioned within an upper portion of said skewering and carving basket, said compression cover including a plurality of apertures.

9. Apparatus in accordance with claim 6 wherein said pressure element comprises a compression cover positioned on an upper portion of said skewering and carving basket, said compression cover comprising a plurality of perpendicular grooves in a lower surface of said cover.

10. Apparatus in accordance with claim 1 wherein said apparatus further comprises a plurality of axially-moveable barrels supported by a moveable plate, said moveable plate having a plurality of apertures therein for receiving a plurality of skewering tubes, said barrels comprising drive barrels which are adapted to support said reception platform.

11. Apparatus in accordance with claim 9 wherein said skewering tubes are supported by said moveable plate, said moveable plate being positioned beneath said reception platform, said moveable plate being provided with a plurality of apertures for permitting passage of said support and ejection rods for said spikes.

12. Apparatus in accordance with claim 9 wherein said support and ejection rods are supported by a lower support plate.

13. Apparatus in accordance with claim 3 wherein said support and ejection rods are axially and translatably mounted.

14. The apparatus according to claim 1 further comprising means for positioning said carving basket on said apparatus, said positioning means comprising a basket support wherein said positioning means is adapted to rotate said basket support, said positioning means further comprising means for immobilizing said basket support.

15. The apparatus according to claim 14 wherein said basket support immobilizing means comprises a pivoting upper locking frame, said locking frame being provided with a blockage element, said locking frame further having an opening directly over said carving basket opening and guides for guiding at least one carving blade.

16. The apparatus according to claim 15 further comprising a protection shield, said protection shield being connected to said upper locking frame and facing said basket support.

17. The apparatus according to claim 14 wherein said basket comprises means for rotating said basket upon a vertical axis at a ninety-degree angle.

18. The apparatus according to claim 12 wherein said support plate has upper and lower surfaces, said upper and lower surfaces having a series of parallel grooves thereon such that the grooves on said upper surface are perpendicular to the grooves on said lower surface, said support plate further comprising locking bars slidably connected to said grooves on said upper and lower surfaces, said locking bars comprising indentations separated by locking tongues, said support plate further having a series of openings perpendicularly arranged with respect to said upper and lower surfaces, said support plate openings having removably inserted therein mounting sockets, said mounting sockets being integral within said piercing tubes, wherein said locking bar cooperates with said mounting socket and comprises means for selectively retaining said mounting socket on said support plate.

19. The apparatus according to claim 18 further comprising means for vertically displacing said support plate, said vertically displacing means comprising a threaded shaft which is rotatably driven.

20. The apparatus according to claim 1 further comprising carving means for carving superimposed layers of said meats, vegetables or other foods.

21. The apparatus according to claim 20 wherein said carving means comprises a plurality of cutting blades positioned in a blade support means, said blade support means being connected to means operationally driving said blade support means.

22. The apparatus according to claim 21 wherein said blade support means comprises a blade holder slidably mounted to a block support means.

23. The apparatus according to claim 20 wherein said carving means is adapted to be vertically displaced with respect to said apparatus, said means for vertically displacing said carving means comprising a plurality of vertical shafts rigidly integral with said carving means.

24. The apparatus according to claim 20 wherein said carving means is adapted to be laterally displaced with respect to said apparatus.

25. The apparatus according to claim 20 wherein said blade support means is suspended by blade support brackets, said brackets being adapted to slidably move said blade support means and said cutting blades.

26. The apparatus according to claim 20 wherein said carving means further comprises protection means, said protection means being placed on the sides of said carving basket in a manner parallel to said cutting blades.

27. The apparatus according to claim 1 wherein said pressing element comprises a presser block having a plurality of openings, said openings being aligned with the ones of said plurality of piercing tubes, said presser block being further adapted to move in vertical translation.

28. The apparatus according to claim 27 wherein said presser block comprises means pivoting said presser block horizontally.

29. The apparatus according to claim 27 wherein said presser block further comprises an extended peripheral lip located on the upper surface of said presser block, said extended peripheral lip being adapted to govern the vertical translation of said presser block.

30. The apparatus according to claim 27 wherein said pressing means comprises two ends, one end being rotatably supported by a journalled bracket on a first fixed column, the other end being releasably connected to a second fixed column, said first and second fixed columns being disposed on opposite sides of said basket support.

31. The apparatus according to claim 27 wherein said presser block is integrally associated with a plurality of vertically disposed guiding shafts, said guiding shafts being adapted to move in vertical translation, thus causing the descent and ascent of said presser block.

32. An apparatus for automatically preparing skewers of meats, vegetables or other foods, said apparatus comprising:
(a) a plurality of axially mobile piercing tubes, each of said piercing tubes having an upper and lower end, said lower end being adapted to receive skewering spikes, and said upper end being adapted to slidably receive means for supporting and ejecting said spikes;
(b) a reception platform for slidably receiving said plurality of piercing tubes, said reception platform having openings therein for the passage of said piercing tubes;
(c) a carving basket connected to said apparatus for receiving layers of said meats, vegetables or other foods;
(d) a plurality of axially mobile barrels supported on said apparatus by a first vertically displaceable support means, said first support means having an opening therein for receiving said piercing tubes, said barrels further comprising means for supporting said reception platform, wherein said piercing tubes are slidably received within said barrels;
(e) a second vertically displaceable support means for supporting said piercing tubes, said second support means being positioned below said first support means, said second support means having openings therein for slidably receiving said means for supporting and ejecting said spikes;
(f) carving means for carving superimposed layers of said meats, vegetables and other foods within said carving basket; and
(g) means for pressing said meats, vegetables and other foods in said carving basket.

33. A method for automatically preparing a plurality of skewers of food products in an apparatus which comprises a reception element, at least one pressure element, at least one skewer, and a piercing tube associated with each skewer, said method comprising:

(a) placing at least one layer of food product between said reception element and said pressure element;

(b) positioning each skewer within an associated piercing tube;

(c) simultaneously inserting each said skewer and said associated piercing tube into said at least one layer of food product, each skewer being inserted into said food through an aperture located in at least one of said reception and pressure elements;

(d) removing each piercing tube from said at least one food product layer and leaving each skewer within said at least one food product layer; and (e) separating said reception and said pressure elements from said at least one food product layer.

34. A method in accordance with claim 33 wherein each of said skewers has a tip which extends beyond one end of an tube when each said skewer and associated piercing tube are inserted into said at least one food layer and when each said skewer is positioned within a respective piercing tube.

35. A method in accordance with claim 33 wherein a plurality of skewers are inserted into said at least one food layer after being positioned within respective piercing tubes, and wherein all of said piercing tubes are removed from said at least one layer, all of said skewers remaining within said at least one food layer when said piercing tubes are so removed.

36. A method in accordance with claim 35 further comprising slicing each said at least one food layer along a plurality of planes located parallel to said skewers and between said skewers, after said piercing tubes are removed from said at least one food layer and prior to separation of said reception and pressure elements from said food layer.

37. A method in accordance with claim 36 wherein after each said skewer is inserted through a respective aperture in one of said elements, and before each piercing tube is removed from said food layer, said at least one food layer and said pressure element are separated, at least one additional food layer is positioned directly adjacent to said at least one food layer, said method further comprising pressing said superimposed food layers between said pressure element and said reception element, thereafter inserting which of said skewers through said at least one additional food layer.

38. A method in accordance with claim 37 wherein at least a second additional food layer is positioned adjacent said at least one additional food layer before said piercing tubes are removed from said food layers.

* * * * *